United States Patent [19]

Weiner

[11] Patent Number: 4,504,311
[45] Date of Patent: Mar. 12, 1985

[54] PROCESS AND APPARATUS FOR A DIRECT FORMATION OF MOLTEN IRON

[75] Inventor: Antoine Weiner, Luxembourg, Luxembourg

[73] Assignee: Arbed S.A., Luxembourg

[21] Appl. No.: 634,755

[22] Filed: Jul. 26, 1984

Related U.S. Application Data

[63] Continuation of Ser. No. 446,054, Dec. 1, 1982, abandoned.

[30] Foreign Application Priority Data

Sep. 12, 1981 [LU] Luxembourg ............................ 83826

[51] Int. Cl.³ ............................................... C21C 7/00
[52] U.S. Cl. .......................................... 75/51; 75/52; 75/59; 75/60
[58] Field of Search ........................... 75/51, 52, 59, 60

[56] References Cited

U.S. PATENT DOCUMENTS 3,663,204  5/1972  Jungwirth .............................. 75/60
4,325,730  4/1982  Schleimer .............................. 75/51

Primary Examiner—Peter D. Rosenberg
Attorney, Agent, or Firm—Fishman & Dionne

[57] ABSTRACT

A process and apparatus are presented for the direct production of molten iron from iron oxide ores in a metallurgical vessel. The process and apparatus involve decarbonization by oxygen blowing of an existing iron melt which has a carbon content above 1% and is covered with a slag layer. Heat is produced and the slag is oxidized and increased by foam formation. The thickness of the slag layer is continuously monitored, and overfoaming is prevented by directing into the melt an inert gas stream via charging units in the bottom of the vessel to counteract the formation of foam. Pulverized ore and carbon in an inert carrier gas are introduced into the slag foam through charging units in the vessel walls above the metal level. Blowing of oxygen and the injection of inert gas are regulated so that the slag level is essentially maintained at a fixed maximum height.

15 Claims, 2 Drawing Figures

PROCESS AND APPARATUS FOR A DIRECT FORMATION OF MOLTEN IRON

This application is a continuation of application Ser. No. 446,054, filed Dec. 1, 1982 now abandoned.

FIELD OF THE INVENTION

This invention relates to the field of the production of molten iron. More particularly, this invention relates to a process and apparatus for the direct production of molten iron from iron oxide ore.

There have been many attempts in the past to derive molten iron from its ore by direct procedures. Thus, procedures are known in which raw material is first transformed into spongy iron with the help of suitable gases; and this material is then melted in a metallurgical vessel, where heat as well as carbon monoxide are formed in the melt vessel by reaction of oxygen-containing gases with carbon-containing substances which are injected mainly under the bath surface. The heat is partially used to melt the spongy iron and heat the exhaust gas for direct reduction of the ore. Of course, in procedures of this type the entire exhaust gas must first be treated in a separate reactor with powdered carbon and hydrogen.

According to another known procedure, a reducing gas is produced, with the help of supplementary heating, in a combination smelting and gas generating reactor by conversion of a fuel with oxygen. The reducing gas is directed to an adjoining reduction chamber in counterflow to an ore charge, the prereduced ore, accumulated at the end of the reducing stage, is conveyed to a heated melting and gas generating chamber and is there simultaneously melted and refined.

Another procedure involves special problems in the creation of reaction zones in melting and gas generating reactors. In the first zone an inert carbon is directly introduced to a metal melt for maintenance of the preferred carbon content of greater than 2%. In a second and adjacent zone, a portion of the carbon contained in the melt is burned by means of oxygen with the liberation of heat and reducing gases. The carbon, introduced by a dipping lance, is used up indirectly by an intermediate recarbonization of the iron bath, essentially for increasing the melt capacity of the bath and for formation of reducing gases.

From the foregoing discussion of known processes, it can be seen that a primary concern is the production of gases for the reduction or at least partial reduction of ore, and this requirement results in substantial complications. In order to produce strong reducing gases for use in a combined reduction and melting process, expensive and complicated measuring and control procedures and equipment must be used to bring the process to the desired result, especially if it is not desired to separately treat the exhaust gases in order to adjust them to an adequate reduction potential.

There is disclosed in Luxembourg Pat. No. 82,227 (assigned to the assignee hereof) a process which achieves the direct reduction of molten iron in a single vessel while avoiding the previously discussed difficulties. The process of this prior Luxembourg Patent provides an iron bath saturated with carbon via the injection of inert carbon by means of a neutral or reducing carrier gas; a cone of iron ore forms at the surface of the bath and oxygen is blown on the peripheral zones of the bath; and the bath is purged with a neutral gas through at least one injection fitting arranged in the bottom of the vessel that makes it possible to control the composition of the gases produced by oxygen blowing of the carbon saturated iron bath; and if these exhaust gases are intended to be used for partial reduction of the ore, they can be produced at practically 100% CO content, with high reducing potential, by adjusting the oxygen supply with decreased purging. In that situation, a steady oxygen blowing effect is preferred and the purging of the bath with inert gas is limited to 0–0.1 $m^3$ STPD. Conversely, an intensive purging of the bath with inert gas promotes afterburning of the carbon monoxide produced at the bath surface which takes place with the evolution of considerable heat. The amount of purged gas is preferably between 0.1–0.3 $m^3$ STPD. The additional heat generated at the bath surface can be used to melt the iron ore brought up to the surface.

The process of prior Luxembourg Pat. No. 82,227 possesses an inherent and self-evident danger, namely that a part of the ore may be integrated into the slag without being reduced. To address this problem, the ore as well as the carbon may be introduced through a dipping lance. However, dipping lances are prone to wear, are expensive and difficult to handle, and require a considerable amount of space for their use. Also, a bottom nozzle could be supplied, through which ore as well as carbon could be added to the melt. However, bottom nozzle units are exposed to high wear just as are dipping lances; and in view of their life requirements, which must be at least equal to that of an oven, bottom nozzle units must be made from an equally expensive material. Moreover, bottom nozzles must be continuously supplied with gas in order to prevent entry of liquid metal, thus requiring the continuous expenditure of usually expensive gas. As a result, it is desired to operate this process only when scheduled, to feed solids through the nozzle only for very short periods of time, and finally to operate only intermittently.

SUMMARY OF THE INVENTION

The above discussed and other problems of the prior art are overcome or reduced by the novel and improved process and apparatus of the present invention.

In accordance with the present invention, molten iron is produced directly from iron ore in a metallurgical vessel. The process and apparatus provide for decarbonization by oxygen blowing of an existing iron melt which has a carbon content above 1% and which is covered with a slag layer; and in which slag is oxidized and foam formation increased, and overfoaming of the slag is prevented by continuous measurement of the thickness of the slag layer. If the thickness of the slag layer exceeds an empirically determined limiting value, an inert gas stream is directed into the iron melt via charging units arranged in the bottom of the vessel to counteract the formation of foam. The process and apparatus further provide for the supply of pulverized iron ore and carbon into the slag foam. The pulverized iron ore and carbon are introduced into the foam with an inert carrier gas through charging units placed in the vessel walls above the level of the metal bath. The blowing of oxygen and the injection of inert gas are regulated so that the slag level is essentially maintained at its predetermined maximum height limit; and oxygen may also be supplied for afterburning of the carbon monoxide formed in the process to contribute heat required for the process.

Of particular importance to note is that the medium in which the metallurgical change takes place is not exclusively the metal bath as in corresponding techniques. Rather, according to the present invention, the metallurgical change takes place mainly in the slag which is, indeed, a foamed and perhaps not fluid slag.

It is also to be noted that the process for direct production of molten iron in accordance with the present invention includes a materials feeder that allows long contact time for the materials being fed and has high flexibility and the possibility of allowing fast change overs from gas to solid materials or mixtures. Also, the process and apparatus of the present invention require no expensive or large additional apparatus, and the unnecessary use of gases and solids is avoided.

BRIEF DESCRIPTION OF THE DRAWINGS

Referring now to the drawings, wherein like elements are numbered alike in the two FIGURES.

DESCRIPTION OF THE PREFERRED EMBODIMENTS

Figure 1:
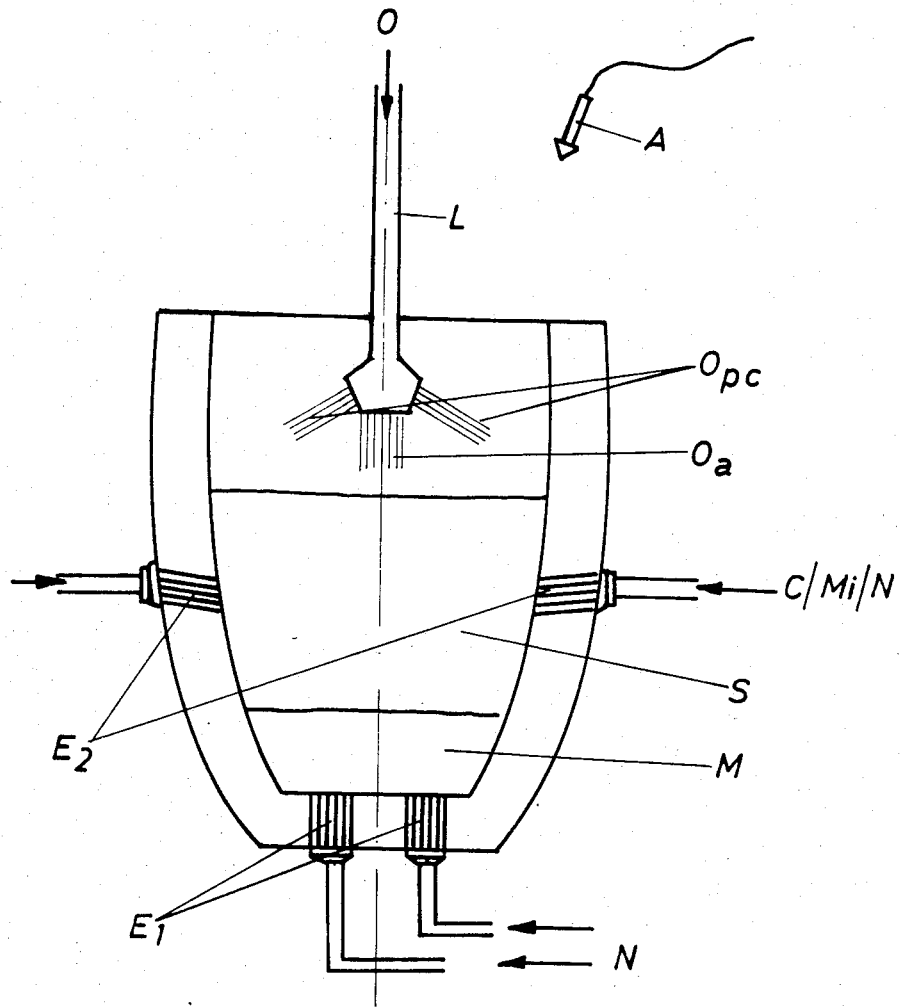
FIG. 1 is a sectional elevation view of a metallurgical vessel incorporating the apparatus of and operated in accordance with the process of the present invention.

Referring to FIG. 1, the equipment for carrying out the present invention includes a converter for the refining of raw iron which is equipped with an oxygen blowing lance L. A metal bath M of molten metal is present in the vessel, and a layer of slag S overlies the metal bath. Lance L is preferably a two cycle blowing lance such as is disclosed in Luxembourg Pat. No. 82,846 (assigned to the assignee of the present invention) which can supply a strong vertical oxygen jet $O_a$ as well as a gentler or less intense angular jet $O_{pc}$. The strong oxygen jet $O_a$ serves to decarbonize the metal, and the gentler angular jet $O_{pc}$ serves to cover the slag surface with an oxygen layer, which can effect an afterburning of the carbon monoxide formed in the process of this invention. This afterburning can contribute to a significant extent to the thermal energy required for operation of the process, most of which requirement is met by the heat liberated on decarbonizing the bath.

Charging units $E_1$ are located in the bottom of the converter, below the molten iron, for the introduction of inert gas. Several charging units $E_2$ are also located in the wall of the vessel above the surface of the molten metal and in communication with the foam slag layer for the introduction of carbon (C) and iron ore (Mi) in a carrier gas, particularly nitrogen (N). The charging units $E_1$ and $E_2$ are refractory, gas-passing structures constructed from at least two segments connected together lengthwise, each segment consisting of a refractory, fireproof material which may be combined with inert carbon or hardened chemically. These individual segments have, on at least one lengthwise face, a wear resistant coating and they are held together by a metal housing which holds the segments tightly together on their lengthwise faces. If necessary or desired, an adhesive cement may bond the facing surfaces. The units are also equipped on one face with manifold and/or distribution chambers for gas and/or solid material supply, and the units are each connected to a dosing apparatus, which may be a known bucketwheel bubble sluiceway as described in Luxembourg Pat. No. 80,692 assigned to the assignee hereof. The charging units $E_1$ and $E_2$ are each, preferably, constructed and operated in accordance with the teachings of Luxembourg Pat. Nos. 82,552 and 82,553, 82,554 and 82,597, all of which are assigned to the assignee hereof. These devices are gas passing structures for the introduction of gases and/or solids into the liquid metal and the slag froth.

As will be apparent, the charging units $E_2$ are exposed to much less severe stress and operating conditions than the charging units $E_1$, since the charging units $E_1$ must be in continuous contact with liquid metal during operation of the process, while the charging elements $E_2$ are in contact with foamy oxidized material of relatively low pressure which exhibits only a slight tendency to penetrate into the charging units. Therefore, it is, at the most, only occassionaly necessary, such as in the case of an overflow of metal, to protect the front faces of the charging elements $E_2$ from penetration by flowing a purging gas across the faces of these elements. Thus, the cooling effects and usage of inert gas which might otherwise be present are avoided with the charging elements $E_2$. In addition, the potential also exists to enlarge the ducts of the charging elements $E_2$. Such enlargement may be obtained by inserting shaped metal inserts between the segments which make up the charging units. In this way, the overall dimensions of the inserts need not be increased, thus avoiding risk of foam penetration or other difficulties in operation.

An acoustic sound measuring device A of the type known in the art is employed for obtaining a continuous determination of the slag layer thickness, it being born in mind that it is an important part of the process of the present invention to determine the slag layer thickness and preferably maintain it at a predetermined maximum level.

In the present invention the metallurgical change takes place mainly in the foam slagged layer. To this end, solid material is delivered to the slag layer through the charging elements $E_2$. The ideal solids composition comprises about 70% iron oxide ($Fe_2O_3$) and 30% carbon (C). Both the carbon and the iron ore are preferably in the form of finely ground material which may be stored separately and mixed with the proper feed gas (e.g., nitrogen) before being delivered to and passing through the charging units. Several of the charging units $E_2$ are located in the wall of the converter, and they may be operated singly or collectively according to demand at any given time. The present invention offers the decided advantage that it is particularly suitable for using large quantities of fine grained iron ore available at relatively low prices. This advantage is particularly attractive in situations where there are available inexpensive transportation systems for the ore by means of pipelines and the ore is available in fine grained state, such as a mean particle size of about 50μ. In prior art processes, such fine grained ore must be converted to pellet form before being additionally processed and used in the making of iron. This requirement to form pellets is a relatively costly additional step, and thus the advantage which might otherwise be gained by inexpensive transportation of fine grained ore is lost. The present invention not only overcomes this disadvantage, but the existence of the fine grained ore is actually an advantage for the practice of the present invention to permit the introduction of the iron ore into the slag in a gas carrier through the charging units $E_2$.

In accordance with the present invention, iron ore and carbon are mixed with an inert gas and delivered to the foam slag layer in the vessel. The metallurgical change to form molten iron takes place primarily in the slag layer. Decarbonization is effected by oxygen blowing from lance L. The slag is oxidized and foam formation increased. The height or thickness of the foam is continuously measured by sensing unit A which, in turn, controls the delivery of nitrogen through charging elements $E_1$. The delivery of nitrogen through the charging elements $E_1$ counteracts the formation of foam. The process is operated to maintain the thickness of the slag layer at a predetermined maximum value. The continuous determination of slag level by thickness measurement is described in Luxembourg Pat. No. 71,261, and the control of foam formation by bottom blowing of inert gas is described in Luxembourg Pat. Nos. 81,207 and 81,859, all of which are assigned to the assignee hereof.

The process of the present invention permits control of the foaming of the slag in a converter during blowing by continuous measurement of slag thickness. Also in accordance with the present invention, the composition of the exhaust gas and the bath temperature are determined either continuously or intermittently by means of conventional apparatus well known in the art (not shown). In response to a decreasing bath temperature the amount of blowing oxygen in oxygen jet $O_a$ over the surface of the bath is increased to maintain the desired temperature. Similarly, a decreasing carbon monoxide (CO) and a simultaneously increasing carbon dioxide ($CO_2$) content in the exhaust gas indicates an insufficient concentration of carbon in the bath; and the supply of solid materials is adjusted to increase the carbon proportion.

The adsorption of carbon by liquid iron is known to be an endothermic reaction. For this reason, the portion of carbon dissolved in iron per quantity of added carbon decreases when large amounts of cooling carrier gas are relied upon for injection. Accordingly, whether the iron melt is saturated or unsaturated with carbon, one must strive for a carbon concentration of over 3% to be maintained in vessels of around 200 tons of iron. The attainment of this concentration requires, in the prior art, the addition of excess carbon with a corresponding high use of cooling carrier gas. Also, since ore is a cooling material, the reduction of ore to metal requires the addition of energy.

These problems or difficulties are reduced with the process of the present invention which takes place in the foamed slag. In addition, only relatively small quantities of carrier gas are needed with the process of the present invention.

Figure 2:
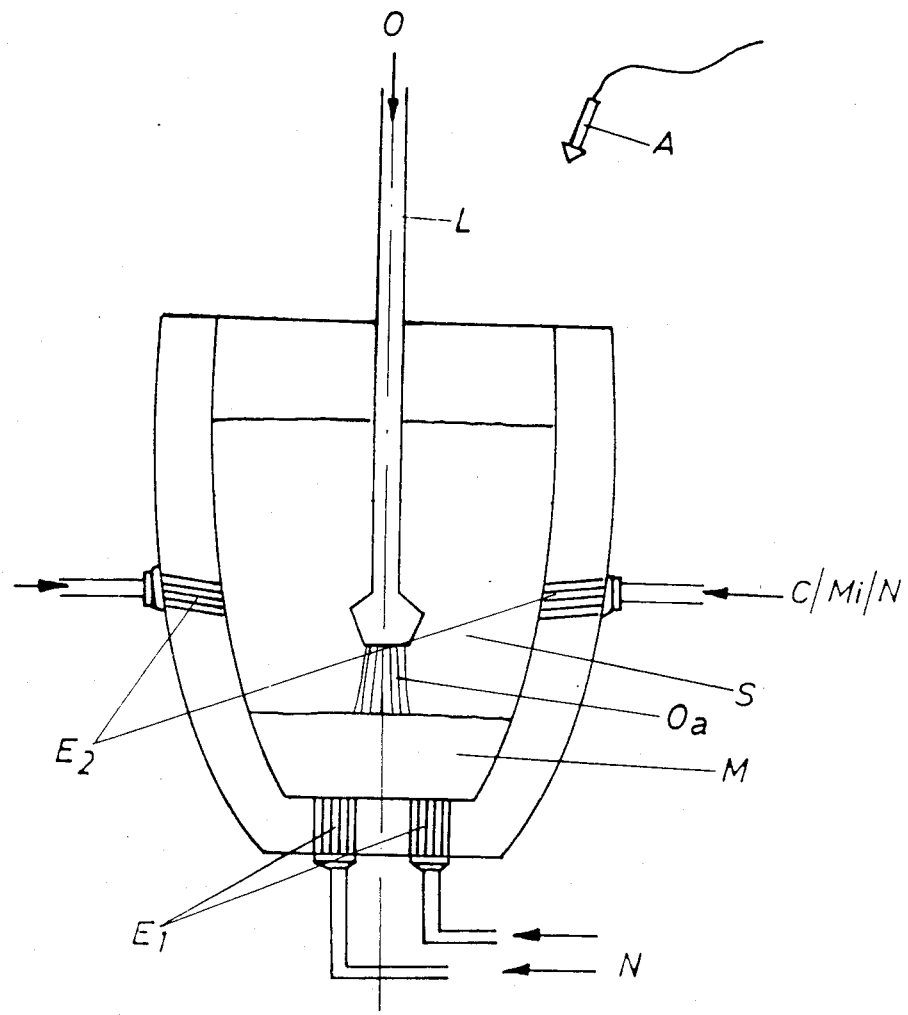
FIG. 2 shows a modified version of the apparatus and method.

Referring now to FIG. 2, a modification is shown for the case where strong foam formation is encountered. In this embodiment, the oxygen blowing lance L is positioned within the foam close to the surface of the molten metal, and a strong vertical oxygen jet ($O_a$) is blown out. The reduction of the iron ore is carried out in the foam by the introduction of carbon as well as by carbon monoxide formed by blowing.

The entire contents of all of the Luxembourg applications referred to herein are hereby incorporated herein by reference to form a part of this application as if fully set forth herein.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. In a continuous process for the direct production of molten iron from iron ore in a metallurgical vessel having an existing iron melt, said melt having a carbon content of over one percent, said melt being covered with a layer of slag, and wherein heat is produced and the slag is oxidized and increased in slag foam formation, the steps of:
   decarbonizing by oxygen top blowing;
   continuously measuring the thickness of the foam layer;
   delivering an inert gas into the iron melt to counteract foam buildup when the slag layer reaches or exceeds an empirically determined limiting value;
   introducing into the slag foam pulverized iron ore and carbon in a carrier gas, said iron ore being introduced into the slag foam through at least one gas passing charging element; and
   controlling the blowing of oxygen and inert gas to maintain the slag level at a predetermined height.

2. The process of claim 1 wherein:
   the inert gas is delivered into the iron melt through charging elements in the bottom of the vessel; and
   the iron ore and carbon are delivered into the foam through charging elements in the sides of the vessel above the surface of the metal melt.

3. The process of claim 2 including:
   continuously measuring the concentration of the exhaust gas produced by the process;
   at least intermittently measuring the bath temperature;
   increasing oxygen blowing in response to reduced bath temperature; and
   increasing the proportion of carbon supplied to the slag in the event of a decrease in carbon monoxide or an increase in carbon dioxide content in the exhaust gas.

4. The process of claim 3 including:
   burning the process exhaust gas at the surface of the bath by a blow of oxygen.

5. The process of claim 1 including:
   continuously measuring the concentration of the exhaust gas produced by the process;
   at least intermittently measuring the bath temperature;
   increasing oxygen blowing in response to reduced bath temperature; and
   increasing the proportion of carbon supplied to the slag in the event of a decrease in carbon monoxide or an increase in carbon dioxide content in the exhaust gas.

6. The process of claim 5 including:
   burning the process exhaust gas at the surface of the bath by a blow of oxygen.

7. The process of claim 1 including:
   burning the process exhaust gas at the surface of the bath by a blow of oxygen.

8. Apparatus for the direct production of molten iron from iron ore; including
   a metallurgical vessel for refining raw iron;
   oxygen blowing lance means positioned for top blowing;
   first charging means in the bottom of said vessel for the introduction of inert gas into the metal melt in the vessel; and
   second charging means in the side wall of said vessel for the introduction of iron ore and/or carbon in a carrier gas into slag in the vessel, said second charging means being located above the normal level of molten metal in the vessel.

9. Apparatus as in claim 8 wherein:
said first and second charging means are the same elements, each including at least two segments of refractory fireproof material joined together along lengthwise faces and contained within a metal housing, and each also including manifold means for delivering gas and/or solids to the charging means.

10. Apparatus as in claim 8 wherein:
each of said first and second charging means has at least one duct formed by two elements of refractory fireproof material joined together along lengthwise faces, said ducts of said second charging means being larger than said ducts of said first charging means.

11. The apparatus of claim 10 including:
spacer inserts between the elements of said second charging means.

12. The apparatus of claim 11 including:
means for continuously measuring the thickness of the slag layer.

13. The apparatus of claim 12 including:
means for continuous or intermittent measurement of the bath temperature and the composition of the exhaust gas.

14. The apparatus of claim 8 including:
means for continuously measuring the thickness of the slag layer.

15. The apparatus of claim 14 including:
means for continuous or intermittent measurement of the bath temperature and the composition of the exhaust gas.

* * * * *